United States Patent
Brahmavar et al.

(10) Patent No.: US 7,084,540 B2
(45) Date of Patent: Aug. 1, 2006

(54) MAGNET MOTOR AND METHOD OF ASSEMBLY

(75) Inventors: Subhash M Brahmavar, Fort Wayne, IN (US); Peter B. Lytle, Fort Wayne, IN (US); Kamron M. Wright, Fort Wayne, IN (US)

(73) Assignee: General Electric Company, Schenectady, NY (US)

( * ) Notice: Subject to any disclaimer, the term of this patent is extended or adjusted under 35 U.S.C. 154(b) by 306 days.

(21) Appl. No.: 10/604,001

(22) Filed: Jun. 20, 2003

(65) Prior Publication Data

US 2004/0258526 A1  Dec. 23, 2004

(51) Int. Cl.
  *H02K 21/12*  (2006.01)

(52) U.S. Cl. .............................. 310/156.38; 310/156.47

(58) Field of Classification Search ........... 310/156.38, 310/156.39, 156.41, 156.43, 156.44–156.47
See application file for complete search history.

(56) References Cited

U.S. PATENT DOCUMENTS

| | | | | |
|---|---|---|---|---|
| 4,642,502 A | * | 2/1987 | Carpenter et al. | 310/156.12 |
| 5,220,228 A | * | 6/1993 | Sibata | 310/254 |
| 5,280,209 A | * | 1/1994 | Leupold et al. | 310/156.41 |
| 5,345,130 A | * | 9/1994 | Kliman et al. | 310/156.13 |
| 5,548,172 A | | 8/1996 | Kliman et al. | 310/156 |
| 5,898,990 A | | 5/1999 | Henry | 29/598 |
| 6,025,666 A | | 2/2000 | Kliman | 310/156 |
| 6,384,503 B1 | * | 5/2002 | Iwaki et al. | 310/156.47 |
| 6,657,349 B1 | * | 12/2003 | Fukushima | 310/156.47 |
| 6,809,451 B1 | * | 10/2004 | Brown | 310/156.08 |

* cited by examiner

*Primary Examiner*—Dang Le
(74) *Attorney, Agent, or Firm*—Ohlandt, Greeley, Ruggiero & Perle, L.L.P.

(57) ABSTRACT

A magnet motor with rotor assembly is provided that has a plurality of magnet members that circumscribe a wall of the rotor core or stator in an orientation that minimizes or eliminates gaps therebetween. The magnet members can have non-parallel opposing sides to allow for elimination of the gaps. The magnet members may have trapezoidal-like shapes.

31 Claims, 5 Drawing Sheets

MAGNET MOTOR AND METHOD OF ASSEMBLY

BACKGROUND OF INVENTION

This invention relates generally to permanent magnet motors and more particularly, to magnet arcs for magnet motors and a method of assembling the magnet arc to a rotor.

Permanent magnet motors, also known as electronically commutated motors (ECM's), are used, or have potential for use, in a wide variety of applications, such as alternators, electronic throttle controls, electric power steering, fuel pumps, heater and air conditioner blower motors, and engine cooling fans. Typical permanent magnet motors have a plurality of arcuate-shaped magnets affixed about the core or circumference of a rotor. The rotor is positioned inside a closely-fitting housing which carries electromagnets for propelling the rotor shaft.

These magnet arcs are affixed to the rotor core using an adhesive. Typically, three such magnet arcs are used, which have an inner curvature that circumscribes the outer circumference of the rotor core. It is desired to have a tight fit or bond between the inner face of the magnet arc and the rotor core to provide a durable and efficient motor. These magnet arcs have straight sides that are parallel to the longitudinal axis of the rotor. Prior magnet arcs have manufacturing tolerances that must be accounted for in assembling the arcs to the rotor core. To ensure that a tight fit between the inner face of the magnet arc and the outer circumference of the rotor core will be achieved, gaps occur between the magnet arcs. These gaps have a negative impact on the operation and performance of the permanent magnet motor, including resulting anomalies in the flux. Additionally, a gap formed between the magnet arcs, or a skewed line between the arcs, which passes by the teeth of the stator provides a blade pass component to the noise and torque of the motor. In prior motors, the total combined degree of curvature of the magnet arcs is less than 360 degrees.

For example, based upon an industry tolerance of +/−1 degree of curvature in the manufacture of magnet arcs, three magnet arcs of 118.5 degrees can be used in the assembly of the magnet motor. Nominally, there will be gaps between the magnet arcs of 1.5 degrees each. With the maximum positive tolerance occurring during manufacturing, there will be gaps of 0.5 degrees between each magnet arc but with the maximum negative tolerance occurring during manufacturing, there will be gaps of 2.5 degrees between each magnet arc. The typical method of assembly uses application of a radial force each of the magnet arcs and attempts to evenly distribute the gaps between the magnet arcs.

Accordingly, there is a need for a magnet motor with magnet arcs that address one or more of the aforementioned drawbacks and of the prior art. In addition, there is a need for a method of assembly of a permanent magnet motor that minimizes the gaps between the magnet arcs that are affixed to the rotor core.

SUMMARY OF INVENTION

In one aspect, a rotor assembly is provided which comprises a rotor having an outer circumference and a longitudinal axis, and a plurality of magnet members secured to the outer circumference. Each of the plurality of magnet members has a degree of curvature about the longitudinal axis. The sum of the degrees of curvature is greater than 355.5 degrees.

In another aspect, a rotor assembly is provided which comprises a rotor having an outer wall with a circumference, and a magnet separated into a plurality of members that are secured to the outer wall and circumscribe the circumference. Each of the plurality of members have a first end and a second end that opposes the first end. Each of the first ends is disposed adjacent to one of the second ends. At least one of the first ends is misaligned with one of the second ends along the circumference.

In another aspect, a rotor assembly is provided which comprises a rotor having a longitudinal axis and an outer wall with a circumference, and a plurality of magnet members secured to the outer wall about the circumference. Each of the magnet members has opposing sides and a center axis. The center axis is parallel to the longitudinal axis. At least two of the plurality of magnet members has the opposing sides nonparallel along the center axis.

In another aspect, a rotor assembly for a magnetic motor is provided which comprises a rotor having a longitudinal axis and a circumferential wall, and a magnet secured about the circumferential wall and separated into a plurality of members along separation lines. Each of the plurality of members are arcuate and have a center axis parallel to the longitudinal axis. Each of the plurality of members abuts another of the plurality of members. At least one of the separation lines is nonparallel to one of the center axes.

In another aspect, a magnetic motor is provided which comprises a stator having an inner wall, a rotor operably connected to the stator and having a longitudinal axis and an outer wall, and a plurality of magnet members secured to either the inner wall of the stator or the outer wall of the rotor. Each of the plurality of magnet members have side walls that oppose each other. The plurality of magnet members circumscribes either the inner wall of the stator or the outer wall of the rotor. The pairs of side walls abut against each other. At least one of the pairs of side walls are nonparallel to the longitudinal axis of the rotor.

In another aspect, a method of assembling a rotor is provided which comprises the steps of forming a plurality of magnet members; positioning the plurality of magnet members about a circumference of the rotor to circumscribe the circumference with the plurality of magnet members having at least one gap therebetween; and applying an axial force to each of the plurality of magnet members. The axial force causes the plurality of magnet members to slide together until the gap is eliminated.

The above-described and other features and advantages of the present disclosure will be appreciated and understood by those skilled in the art from the following detailed description, drawings, and appended claims.

DETAILED DESCRIPTION

Figure 1:
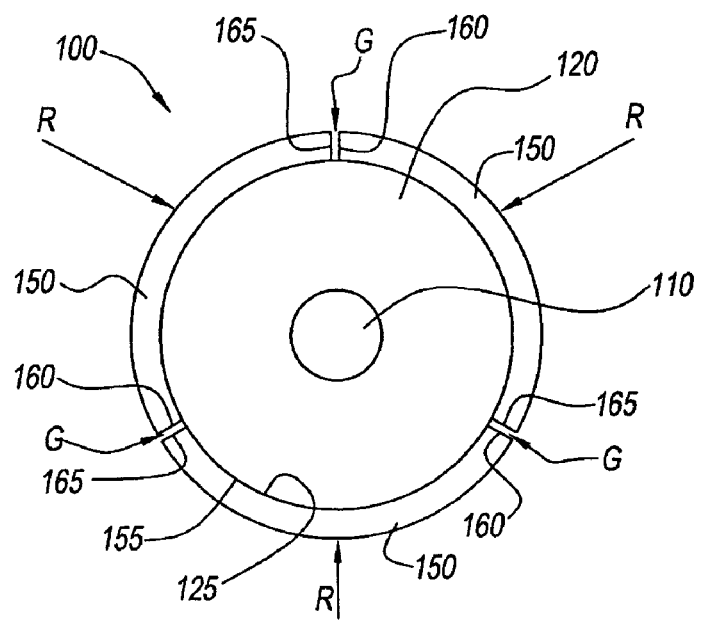
FIG. 1 is a top view of a prior art rotor configuration.
Figure 2:
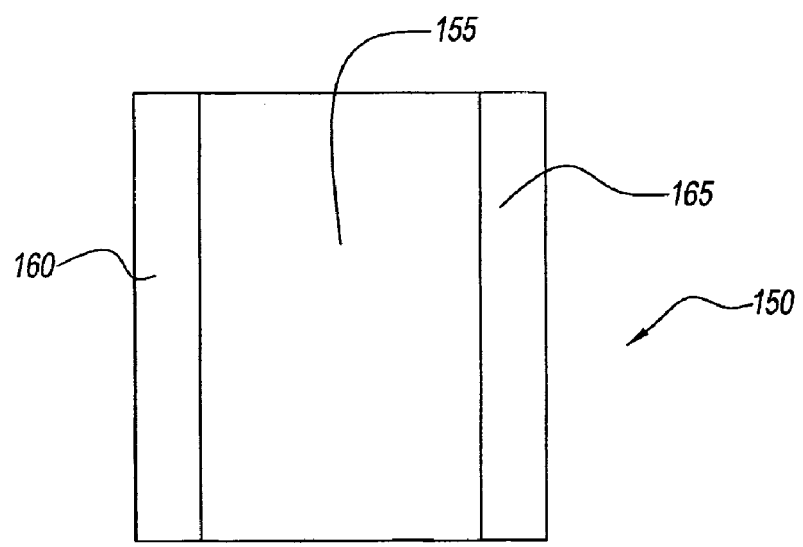
FIG. 2 is a front view of a prior art magnet arc of the rotor configuration of FIG. 1.

Referring now to the drawings, and in particular to FIGS. 1 and 2, the rotor configuration of a (prior art) conventional permanent magnet motor is shown and generally referred to by reference numeral 100. Rotor configuration 100 has a rotor shaft 110 having a rotor core 120 with an outer wall 125. The rotor configuration 100 also has three magnet arcs 150 having parallel side walls 160, 165. The three magnet arcs 150 are affixed to outer wall 125 of the rotor core 120 by adhesive or other known methods. The assembly of rotor configuration 100 provides a tight fit between an inner face 155 of the magnet arcs 150 and the outer wall 125 of the rotor core 120. However, the assembly of rotor configuration 100 results in the formation of gaps G between the side walls 160, 165 of each of the magnet arcs due to the manufacturing tolerances of the magnet arcs. The conventional method of assembly applies radial force R to each of the magnet arcs 150 for a tight bond between the magnet arcs and the radial core 120, as well as to attempt to evenly distribute the gaps G between the magnet arcs.

Figure 3:
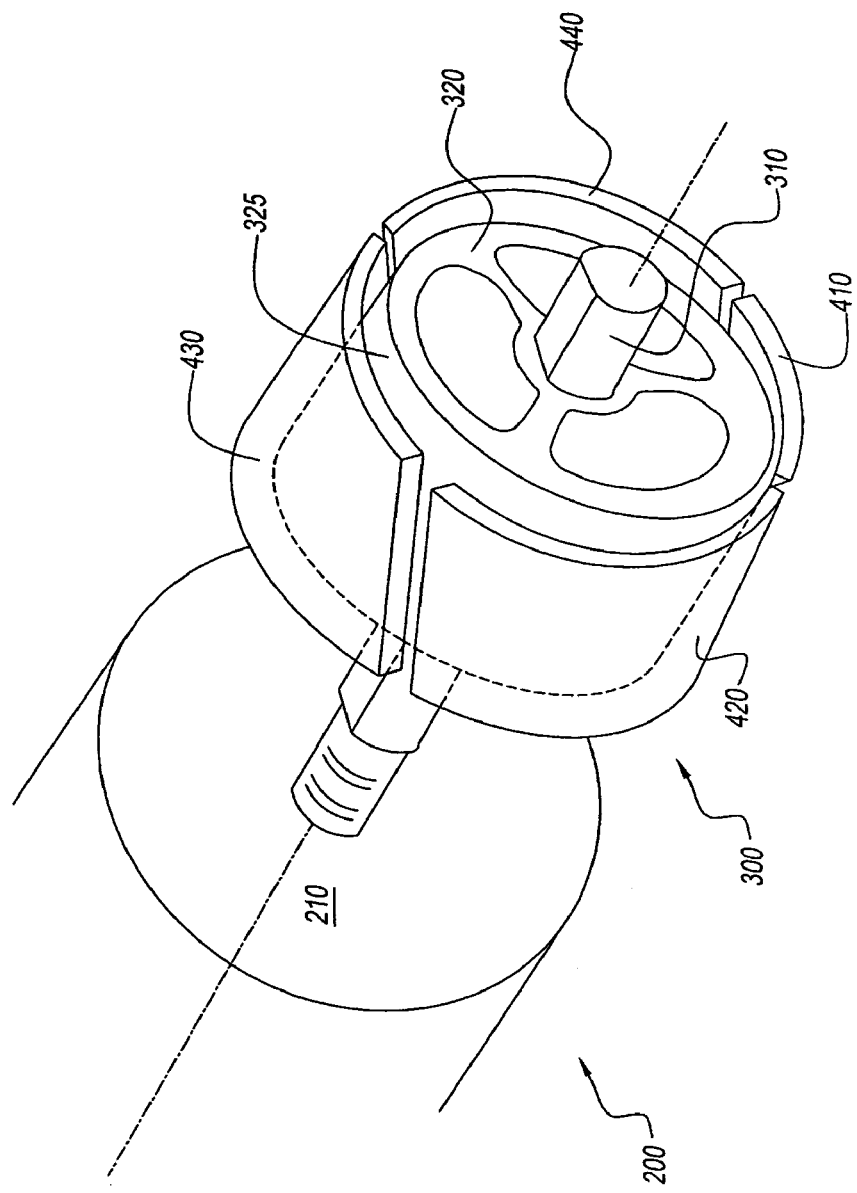
FIG. 3 is an exploded perspective view of an exemplary embodiment of a magnet motor with rotor assembly.
Figure 4:
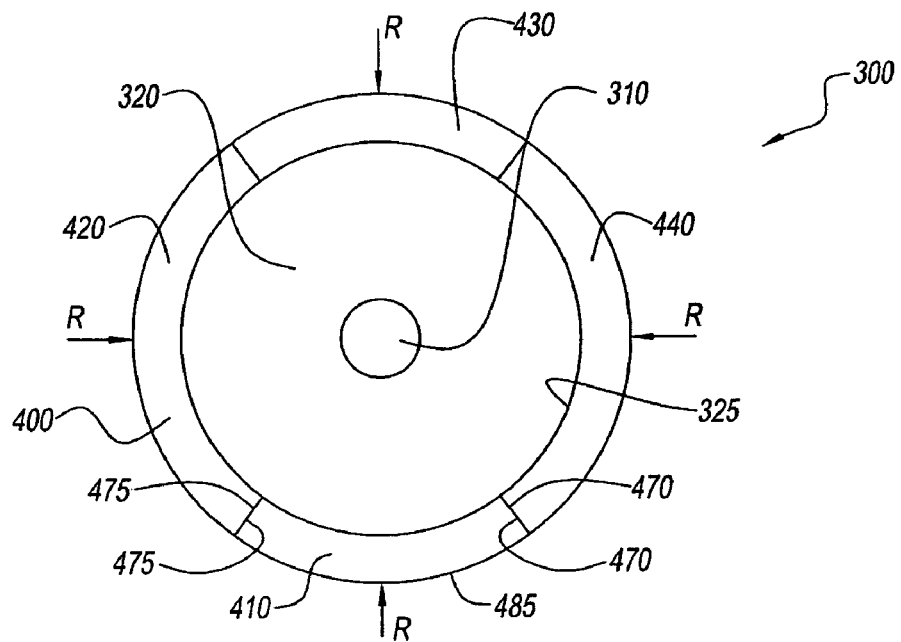
FIG. 4 is a top view of the rotor assembly of FIG. 3.

Referring to FIGS. 3 and 4, an exemplary embodiment of a magnet motor with a rotor assembly generally referred to by reference numerals 200, 300, respectively, is illustrated. Rotor assembly 300 is for use with permanent magnet motor 200 and is positioned inside a closely-fitting housing 210 having a stator (not shown) for propelling the rotor assembly.

Rotor assembly 300 has a rotor shaft 310, a rotor core 320, and a permanent magnet 400. Permanent magnet 400 is separated into a plurality of magnet members or arcs 410, 420, 430 and 440. Rotor core 320 has an outer circumference or circumferential wall 325.

In this exemplary embodiment, magnet 400 is separated into four magnet arcs 410, 420, 430 and 440 but can be separated into any number of magnet arcs.

Referring to FIGS. 3 through 7, magnet arc 410 (as well as magnet arcs 420, 430 and 440) has a first end wall 460, a second end wall 465, a first side wall 470, a second side wall 475, a curved inner face 480 and a curved outer face 485. Preferably, first and second end walls 460, 465 are parallel to each other and of different lengths. The different lengths of first and second end walls 460, 465 provides for different degrees of curvature along the curved inner face 480. First and second side walls 470, 475 are nonparallel to both the longitudinal axis of rotor assembly 300 and a center axis of magnet arc 410 such that the first and second side walls are tapered, sloped or angled inwardly in the direction of first end wall 460. The angled side walls 470, 475, along with first and second end walls 460, 465, provide a trapezoidal shape to magnet arc 410. Preferably, first and second side walls 470, 475 are equally inwardly angled or have equal slopes. First and second side walls 470, 475 are preferably of equal length to form an isosceles trapezoidal shape.

Figure 8:
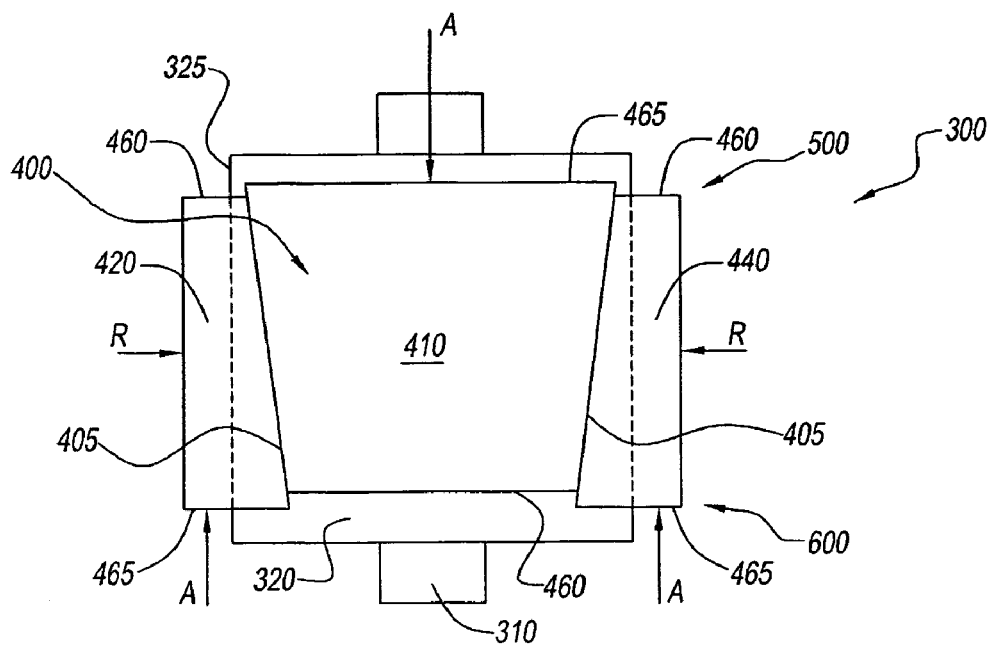
FIG. 8 is front view of the rotor assembly of FIG. 3.
Figure 5:
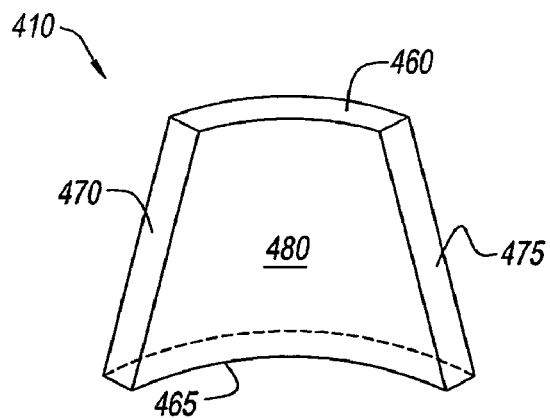
FIG. 5 is a perspective view of a magnet arc of the rotor assembly of FIG. 3.
Figure 6:
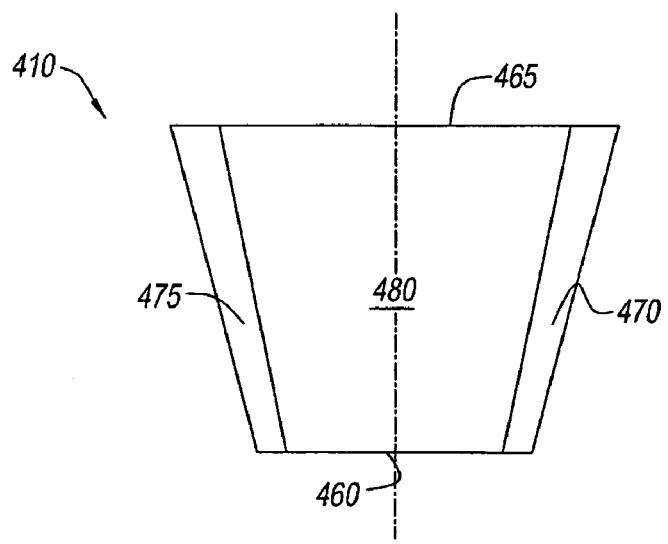
FIG. 6 is a front view of the magnet arc of FIG. 5.
Figure 7:
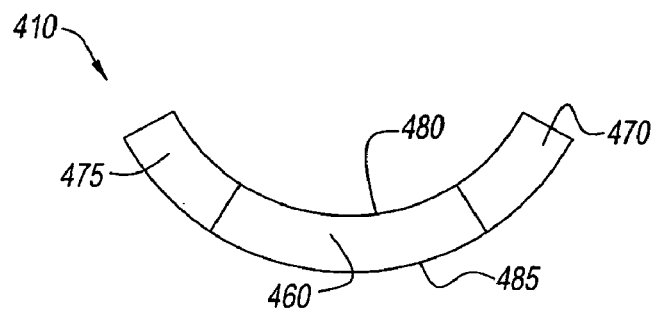
FIG. 7 is a top view of the magnet arc of FIG. 5.

The inner face 480 of magnet arc 410 has a radius of curvature that is approximately equal to the radius of curvature of the outer wall 325 of the rotor core 320 to allow for a tight fit between the magnet arc and the rotor core 320. Magnet arcs 410, 420, 430 and 440 are affixed to outer wall 325 of the rotor core 320 by adhesive or other known methods, in alternating orientations. By alternating the orientations of magnet arcs 410, 420, 430 and 440 along outer wall 325, each first side wall 470 will abut against a corresponding first side wall, and each second side wall 475 will abut against a corresponding second side wall 475, to form a hollow cylindrical magnet 400 circumscribing the outer wall of rotor core 320. As shown in FIG. 8, the cylindrical magnet 400 has separation lines 405 formed by the abutment of the pairs of first side walls 470 and the pairs of second side walls 475. Separation lines 405 are nonparallel with both the longitudinal axis of rotor assembly 300 and the center axis of magnet member 410. The angle of first side walls 470 and second side walls 475 can be obtained through known methods, including machining, such as, for example, grinding, to achieve an equal angle or slope. For a trapezoidal shape of magnet arc 410, a trapezoidal mold could be used with grinding being performed to achieve the smooth, precise surface.

The assembly of rotor assembly 300 provides a tight fit between inner faces 480 of the magnet arcs 410, 420, 430 and 440 and the outer wall 325 of the rotor core 320 but eliminates any gap at separation lines 405 between adjacent first side walls 470 of each of the magnet arcs or between adjacent second side walls 475 of each of the magnet arcs. The gaps are eliminated even with the manufacturing tolerances that are incorporated into the degree of curvature of the magnet arcs 410, 420, 430 and 440.

Referring to FIGS. 3 through 8, to assemble rotor assembly 300, axial forces A that are parallel to the longitudinal axis of the rotor assembly and radial forces R that are perpendicular to the longitudinal axis of the rotor assembly, are applied to each magnet arc 410, 420, 430 and 440. As shown in FIG. 8, the axial forces A are applied to all of the second end walls 465 so that magnet arcs 410, 430, and magnet arcs 420, 440, which are oppositely orientated from each other, will receive an axial force in the opposite direction. However, alternatively, axial forces A could be applied to all of the first end walls 460. Axial forces A cause magnet arcs 410, 420, 430 and 440 to slide together along second side walls 465 until any gap between the magnet arcs is eliminated. The radial forces R are applied to outer face 485 of each of the magnet arcs 410, 420, 430 and 440 to provide for a tight bond between the magnet arcs and rotor core 320. Preferably, radial forces R are diametrically opposed along rotor assembly 300.

As shown in FIG. 8, the manufacturing tolerances in the degree of curvature that are incorporated into magnet arcs 410, 420, 430 and 440, are accounted for along upper edge 500 and lower edge 600 of assembly 300, where first and second end walls may not be completely aligned. This method of assembly using magnet arcs 410, 420, 430 and 440 with angled first and second side walls 460, 465 and alternating their orientation along outer wall 325 of rotor core 320, effectively eliminates gaps between the magnet arcs.

While the exemplary embodiment uses four magnet arcs 410, 420, 430 and 440 having the same size and shape, the present disclosure contemplates the use of any plurality of magnet arcs that use the together of tapered or angled first and second side walls 470, 475. The first and second side walls 470, 475 can be disposed on each of the magnet arcs so that identical magnet arcs are used or can be distributed amongst the magnet arcs in combination with straight side walls. The use of magnet arcs 410, 420, 430 and 440 having the same size and shape is preferred because it is cost effective in manufacturing and assembly. Preferably, any even number of magnet arcs 410, 420, 430 and 440 can be used so that the magnet arcs are diametrically opposed along outer wall 325 of rotor core 320 and orientated in an alternating pattern along the outer wall.

Additionally, the present disclosure contemplates the use of an odd number of magnet arcs 410, 420, 430 and 440 to form magnet 400. In such a configuration, one (or more) of the magnet arcs could have straight side walls, while the remaining magnet arcs would have a straight side wall and an angled side wall (in opposing directions) so that the straight side walls could slide along each other while the angled side walls would slide along each other in opposing directions until any gaps were eliminated. The application of both radial forces R and axial forces A to the various configurations described-above, eliminates the gaps in magnet 400. Rotor assembly 300 can have at least two nonparallel separation lines 405 in magnet 400 which will eliminate the gaps when axial forces A are applied causing movement along the separation lines.

Figure 9:
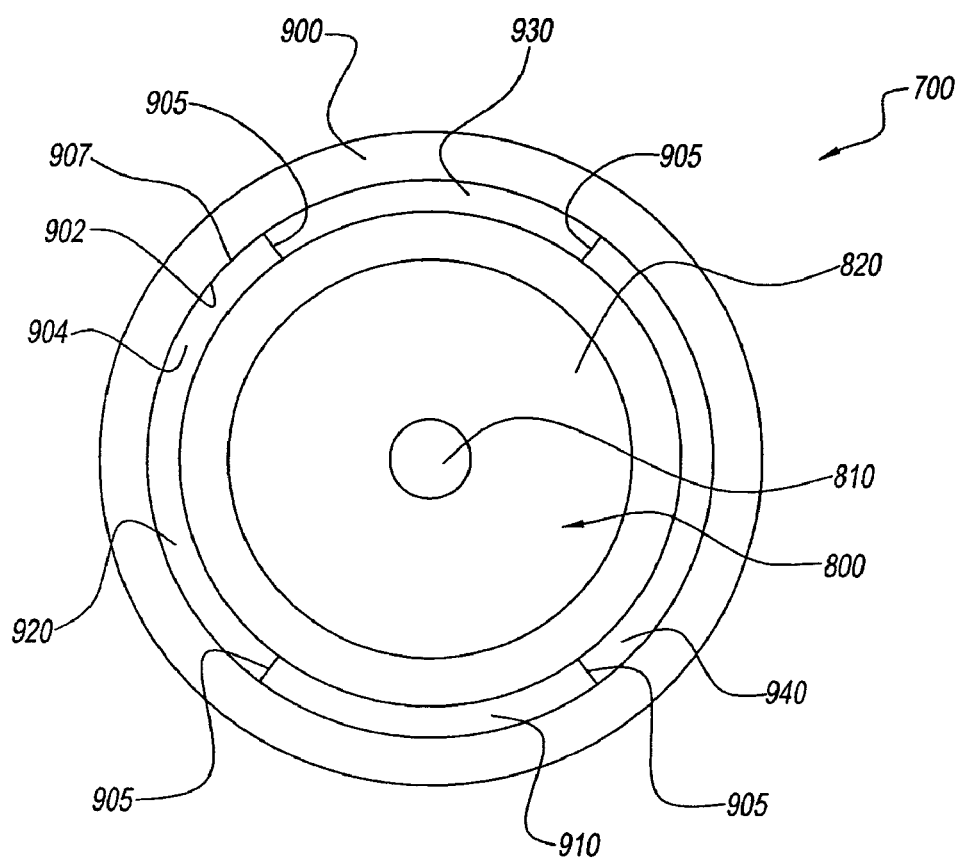
FIG. 9 is a top view of another embodiment of a magnet motor.

Referring to FIG. 9, another embodiment of a magnet motor generally referred to by reference numeral 700, is illustrated. Magnet motor 700 has a rotor assembly 800 and a stator 900 operably connected to the rotor assembly. Rotor assembly 800 has a rotor shaft 810 and a rotor core 820.

Stator 900 has an inner wall or circumference 902 and a permanent magnet 904 secured thereto. Magnet 904 is separated into a plurality of magnet members or arcs 910, 920, 930 and 940 having outer faces 907. In the embodiment of FIG. 9, magnet 904 remains stationary.

The magnet members 910, 920, 930 and 940 abut against each other along separation lines 905. The magnet members 910, 920, 930 and 940 have a size and shape that allows the outer face 907 of the magnet members to be secured to the inner wall 902 of the stator. Similar to the exemplary embodiment of FIGS. 3-8, the sizes and shapes of magnet members 910, 920, 930 and 940 eliminate any gap between the magnet members along the separation lines 905.

While the instant disclosure has been described with reference to one or more exemplary embodiments, it will be understood by those skilled in the art that various changes may be made and equivalents may be substituted for elements thereof without departing from the scope thereof. In addition, many modifications may be made to adapt a particular situation or material to the teachings of the disclosure without departing from the scope thereof. Therefore, it is intended that the disclosure not be limited to the particular embodiment(s) disclosed as the best mode contemplated for carrying out this invention, but that the invention will include all embodiments falling within the scope of the appended claims.

The invention claimed is:

1. A rotor assembly comprising:
    a rotor having an outer wall with a circumference; and
    a magnet separated into a plurality of members that are secured to said outer wall and circumscribe said circumference, each of said plurality of members having a first end and a second end opposing said first end,
    wherein each of said first ends is disposed adjacent to one of said second ends, and wherein at least one of said first ends is misaligned with one of said second ends along said circumference, wherein said at least one of said first ends has a first degree of curvature about said circumference, wherein said one of said second ends has a second degree of curvature about said circumference, and wherein said first degree of curvature is greater than said second degree of curvature.

2. The rotor assembly of claim 1, wherein said first and second ends are parallel to each other.

3. The rotor assembly of claim 1, wherein said plurality of members have a trapezoidal shape.

4. The rotor assembly of claim 1, wherein said first end has a first degree of curvature about said circumference, wherein said second end has a second degree of curvature about said circumference, wherein a first sum of said first degrees of curvature is greater than 360 degrees, and wherein a second sum of said second degrees of curvature is less than 360 degrees.

5. The rotor assembly of claim 1, wherein said plurality of members is an even number of members.

6. A rotor assembly comprising:
    a rotor having a longitudinal axis and an outer wall with a circumference; and
    a plurality of magnet members secured to said outer wall about said circumference, each of said magnet members having opposing sides and a center axis, said center axis being parallel to said longitudinal axis, wherein at least two of said plurality of magnet members have said opposing sides being nonparallel along said center axis, wherein said opposing sides are first and second sides, wherein said first side forms a first angle with said center axis, wherein said second side forms a second angle with said center axis, wherein each of said first sides of said plurality of magnet members abuts another of said first sides of said plurality of magnet members, and wherein each of said second sides of said plurality of magnet members abuts another of said second sides of said plurality of magnet members.

7. The rotor assembly of claim 6, wherein said at least two of said plurality of magnet members have a trapezoidal shape.

8. The rotor assembly of claim 6, wherein said at least two of said plurality of magnet members have the same shape.

9. The rotor assembly of claim 6, wherein said plurality of magnet members is an even number of magnet members.

10. The rotor assembly of claim 6, wherein said first and second angles are equal.

11. The rotor assembly of claim 6, wherein each of said plurality of magnet members has opposing third and fourth sides, and wherein said third and fourth sides are parallel to each other.

12. The rotor assembly of claim 11, wherein each of said third sides of said plurality of magnet members is disposed adjacent to one of said fourth sides of said plurality of magnet members.

13. The rotor assembly of claim 6, wherein said circumference of said outer wall has a first radius of curvature, wherein each of said plurality of magnet members has an inner face having a second radius of curvature, and wherein said first and second radii of curvature are about equal.

14. A rotor assembly for a magnetic motor comprising:
    a rotor having a longitudinal axis and a circumferential wall; and
    a magnet secured about said circumferential wall and separated into a plurality of members along separation lines, each of said plurality of members being arcuate and having a center axis parallel to said longitudinal axis,
    wherein each of said plurality of members abuts another of said plurality of members, and wherein at least one of said separation lines is nonparallel to one of said center axes, wherein each of said plurality of members has first and second side walls, wherein said first side wall forms a first angle with said center axis, wherein said second side wall forms a second angle with said center axis, wherein each of said first side walls of said plurality of members abuts another of said first side walls of said plurality of members, and wherein each of said second side walls of said plurality of members abuts another of said second side walls of said plurality of members.

15. The rotor assembly of claim 14, wherein at least two of said plurality of members have the same shape.

16. The rotor assembly of claim 15, wherein said first and second angles are equal.

17. The rotor assembly of claim 14, wherein said plurality of members is an even number of members.

18. The rotor assembly of claim 14, wherein each of said plurality of members has a first end wall and a second end wall, and wherein said first and second end walls are parallel to each other.

19. The rotor assembly of claim 14, wherein each of said plurality of members has a first end wall having a first length and a second end wall having a second length, and wherein each of said first end walls of said plurality of members is disposed adjacent to at least one of said second end walls of said plurality of members.

20. The rotor assembly of claim 14, wherein at least two of said plurality of members have a trapezoidal shape.

21. The rotor assembly of claim 20, wherein said trapezoidal shape is isosceles.

22. The rotor assembly of claim 14, wherein said circumferential wall has a first radius of curvature, wherein each of said plurality of members has an inner face having a second radius of curvature, and wherein said first and second radii of curvature are about equal.

23. A magnetic motor comprising:
a stator having an inner wall;
a rotor operably connected to said stator and having a longitudinal axis and an outer wall; and
a plurality of magnet members secured to either said inner wall of said stator or said outer wall of said rotor, each of said plurality of magnet members having side walls that oppose each other,
wherein said plurality of magnet members circumscribes either said inner wall of said stator or said outer wall of said rotor,
wherein pairs of said side walls abut against each other, and
wherein at least one of said pairs of side walls are nonparallel to said longitudinal axis of said rotor;
wherein said side walls are first and second side walls of each of said plurality of magnet members,
wherein each of said plurality of magnet members has a center axis that is parallel to said longitudinal axis of said rotor,
wherein said first side wall forms a first anale with said center axis,
wherein said second side wall forms a second angle with said center axis,
wherein each of said first side walls of said plurality of magnet members abuts another of said first side walls of said plurality of magnet members, and
wherein each of said second side walls of said plurality of magnet members abuts another of said second side walls of said plurality of magnet members.

24. The motor of claim 23, wherein at least two of said plurality of magnet members have the same shape.

25. The motor of claim 23, wherein said plurality of magnet members is an even number of magnet members.

26. The motor of claim 23, wherein said first and second angles are equal.

27. The motor of claim 23, wherein each of said plurality of magnet members has a first end wall and a second end wall, and wherein said first and second end walls are parallel to each other.

28. The motor of claim 23, wherein each of said magnet members has opposing first and second end walls, wherein said first end wall has a first length and said second end wall has a second length, and wherein each of said first end walls of said plurality of magnet members is disposed adjacent to at least one of said second end walls of said plurality of magnet members.

29. The motor of claim 23, wherein at least two of said plurality of magnetic members have a trapezoidal shape.

30. The motor of claim 29, wherein said trapezoidal shape is isosceles.

31. The motor of claim 23, wherein either said outer wall of said rotor or said inner wall of said stator has a first radius of curvature, wherein each of said plurality of magnet members has a second radius of curvature, and wherein said first and second radii of curvature are about equal.

* * * * *